United States Patent

[11] 3,578,045

[72] Inventors John B. Lundberg;
Richard J. Beck; James N. Locke, Lodi, Calif.
[21] Appl. No. 827,692
[22] Filed May 26, 1969
[45] Patented May 11, 1971
[73] Assignee Super Mold Corporation
Lodi, Calif.

[54] EXPANDING TIRE-SUPPORTING WHEEL APPARATUS
7 Claims, 15 Drawing Figs.

[52] U.S. Cl. .................................................. 144/288, 157/13
[51] Int. Cl. .................................................. B60c 25/00
[50] Field of Search .................................................. 144/288.1; 157/(WH), 13; 279/2; 269/(Inquired)

[56] References Cited
UNITED STATES PATENTS
776,831  12/1904  Geddes .................................. 144/288.1X
1,194,967  8/1916  DeMattia ............................. 144/288.1
2,197,808  4/1940  Mason .................................. 144/288.1
3,291,171  12/1966  Lehmann ............................. 144/288.1

Primary Examiner—Donald R. Schran
Attorney—Fulwider, Patton, Rieber, Lee and Utecht ABSTRACT: An expanding wheel apparatus for temporarily supporting a pneumatic tire during operations such as buffing, grinding, smoothing and dressing preparatory to recapping or retreading the tire. The apparatus includes a rotatable shaft to which is keyed a scroll wheel. A jaw support is rotatably supported by the shaft, with a plurality of jaws being carried by such jaw support for radial movement relative thereto. Engaged helically extending teeth are carried by the jaws and the scroll wheel. When the jaw support is locked in place, the rotation of the scroll wheel will extend or retract the jaws. The jaws support a radially expandable band assembly that receives the tire when such assembly is in a contracted position. The wheel assembly is radially expanded when the jaws undergo radial movement relative to the scroll wheel.

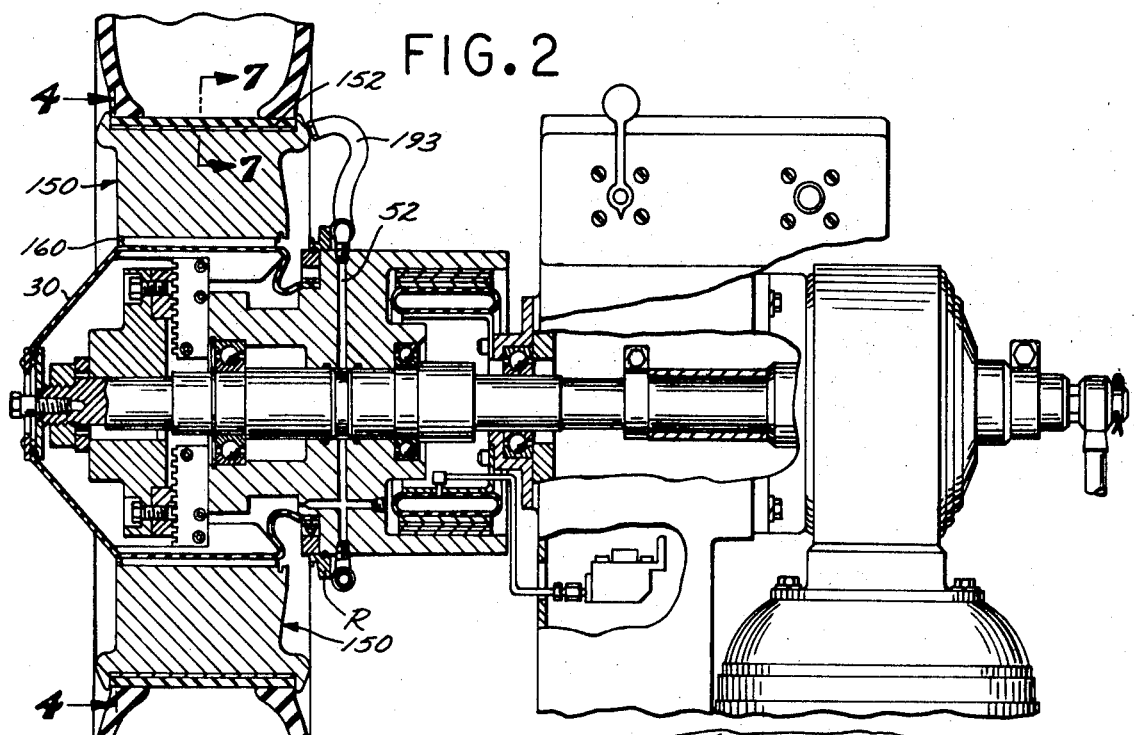
FIG. 2
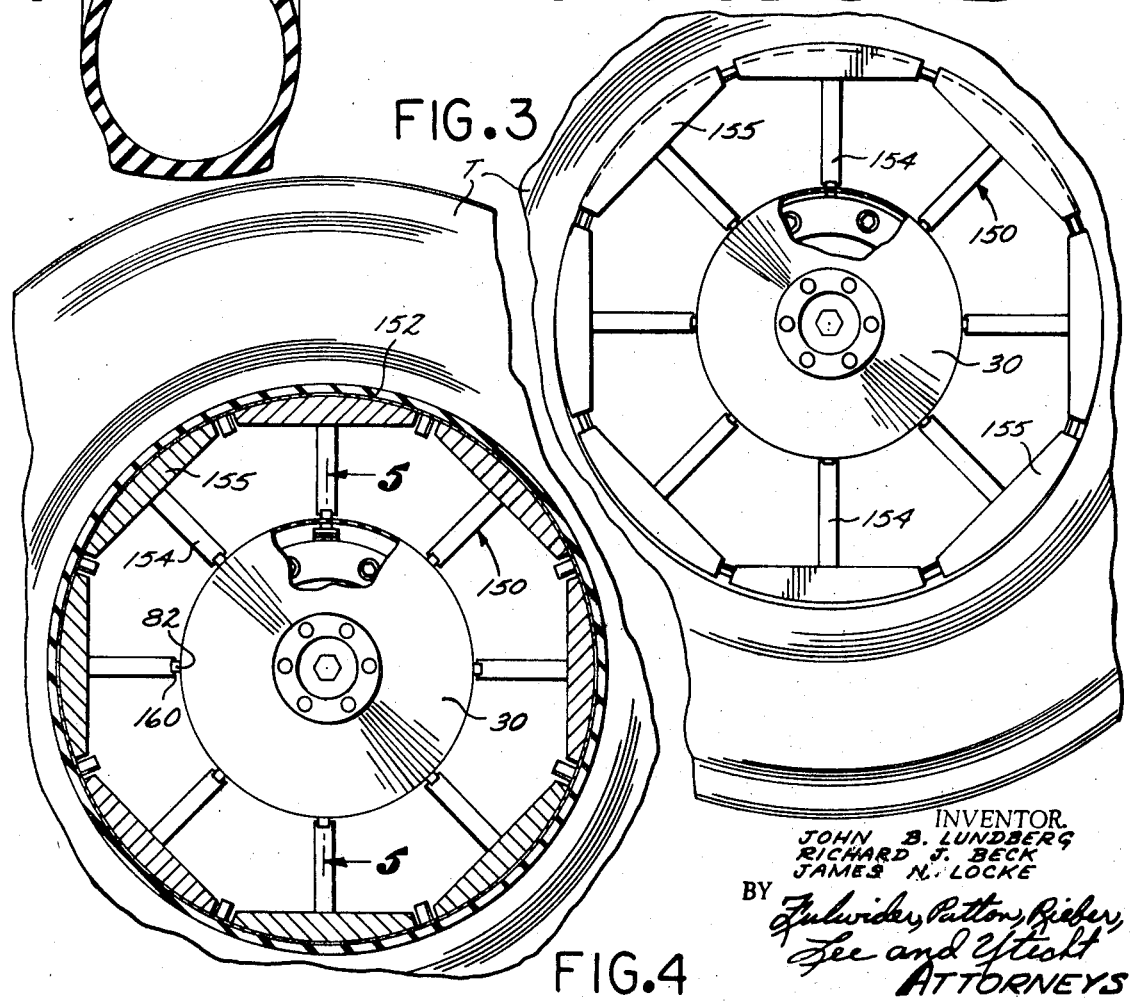
FIG. 3
FIG. 4
INVENTOR.
JOHN B. LUNDBERG
RICHARD J. BECK
JAMES N. LOCKE
BY Fulwider, Patton, Rieber, Lee and Utecht
ATTORNEYS

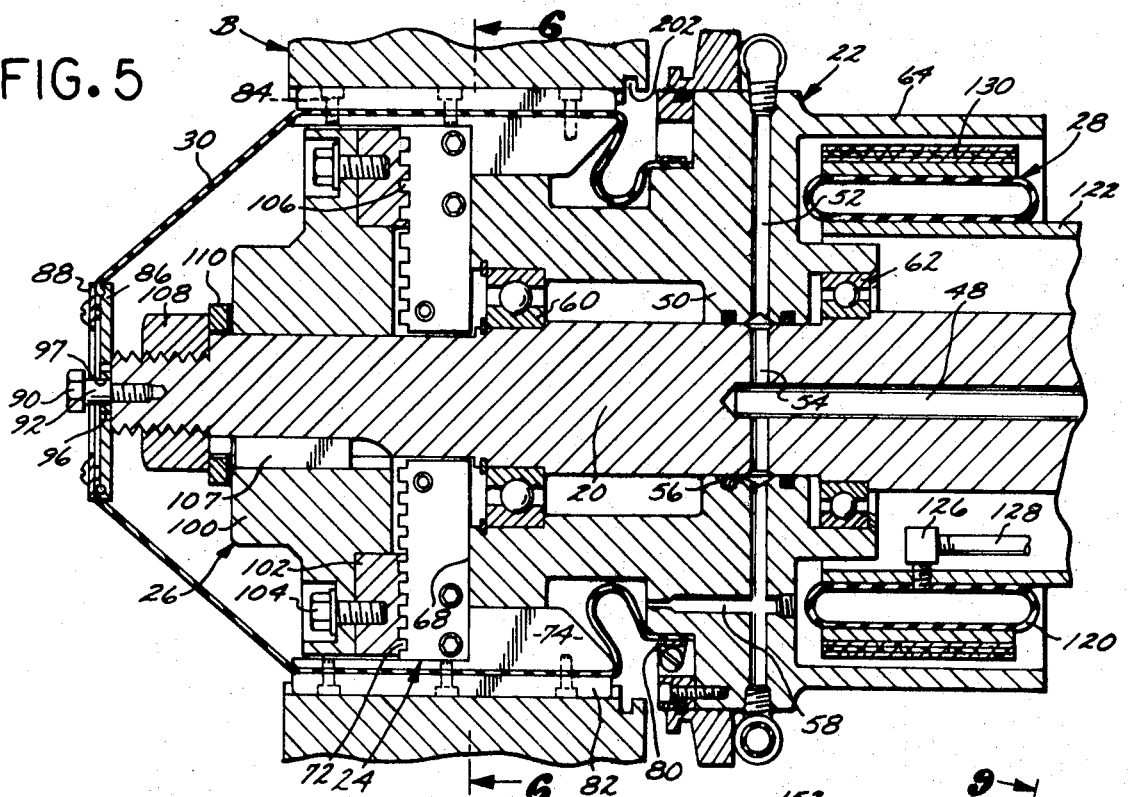
FIG. 5
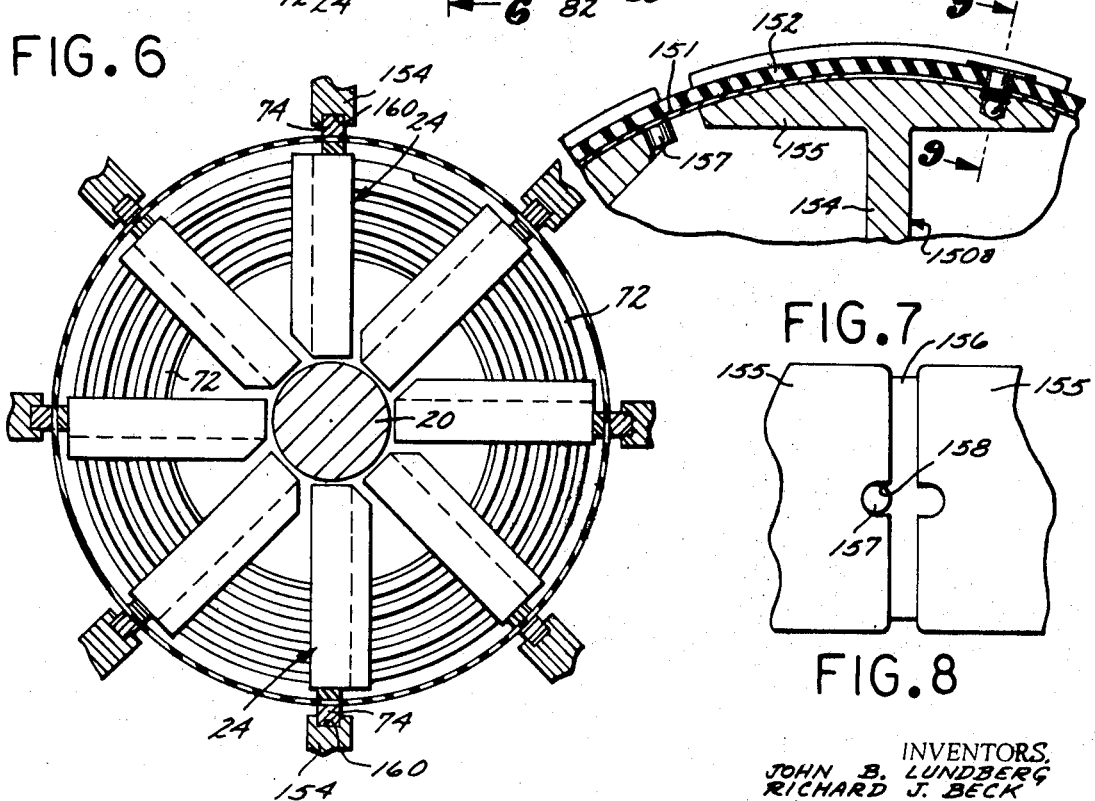
FIG. 6
FIG. 7
FIG. 8
INVENTORS,
JOHN B. LUNDBERG
RICHARD J. BECK
JAMES N. LOCKE
BY Fulwider, Patton, Rieber,
Lee and Utecht
ATTORNEYS

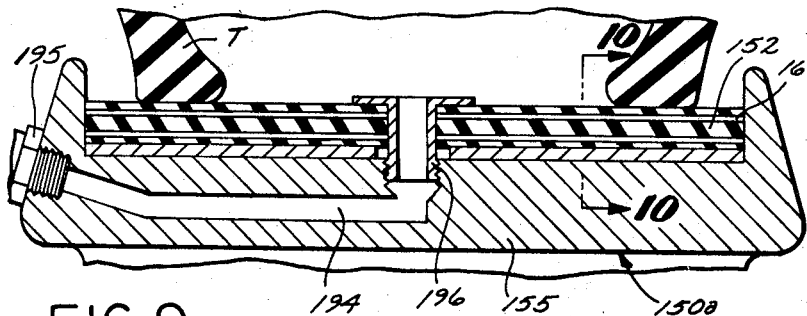
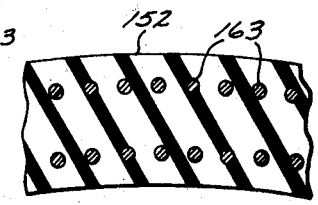
FIG.9  FIG.10
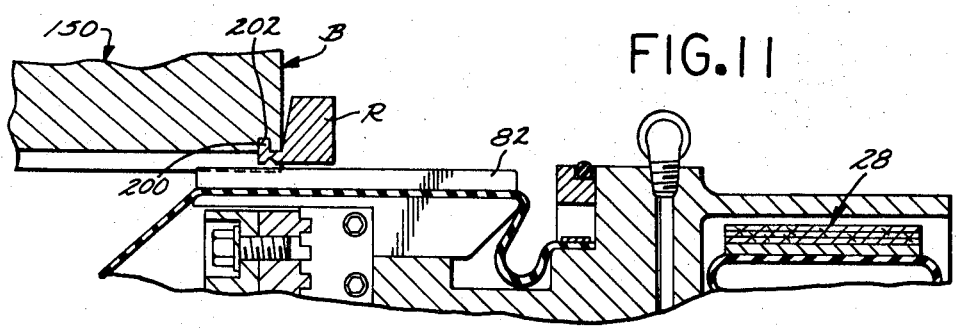
FIG.11
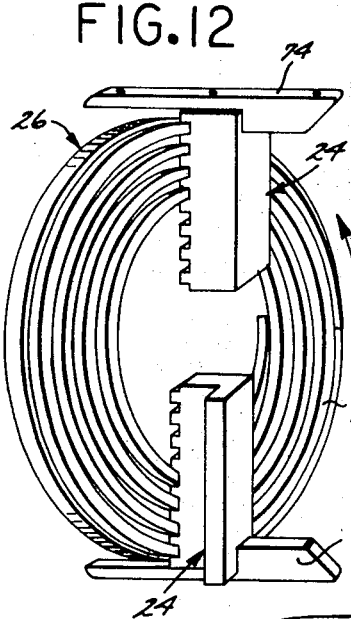
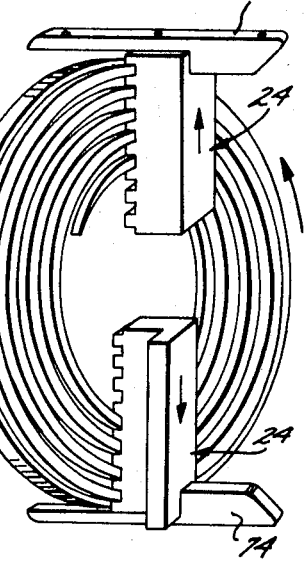
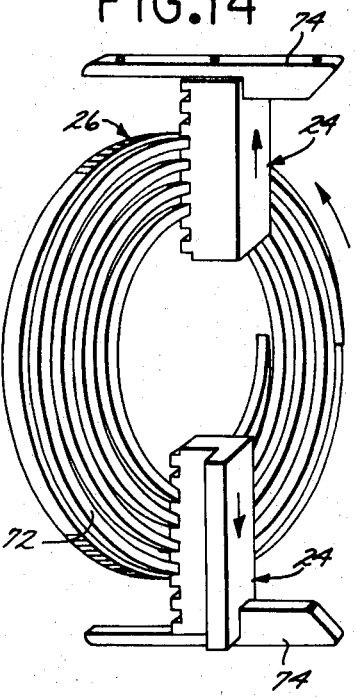
FIG.12  FIG.13  FIG.14
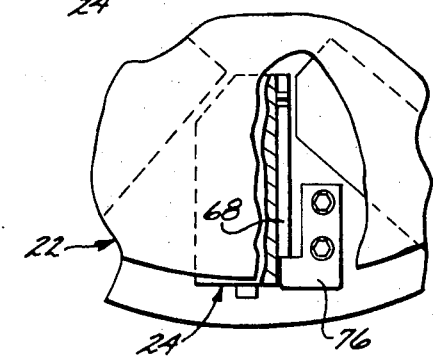
FIG.15
INVENTORS
JOHN B. LUNDBERG
RICHARD J. BECK
JAMES N. LOCKE
BY Fulwider, Patton, Rieber,
Lee and Utecht
ATTORNEYS 3,578,045

EXPANDING TIRE-SUPPORTING WHEEL APPARATUS

BACKGROUND OF THE INVENTION

1. Field of the Invention

The present invention relates to tire mounting and inflating apparatus and more particularly to a power expanded wheel that temporarily supports a tire for rotation.

2. Description of the Prior Art

Prior art is represented by U.S. Pat. Nos. 2,960,130; and 3,291,171.

SUMMARY OF THE INVENTION

The tire supporting apparatus of the present invention is characterized by a frame which rotatably supports a shaft. A jaw support is rotatably supported by this shaft, with such jaw support in turn carrying a plurality of jaws for radial movement, the jaws being formed with helically extending teeth. A radially expandable band assembly is supported by the jaws, such wheel assembly receiving a tire when the wheel assembly is disposed in a contracted position. A scroll wheel is keyed to the shaft and is formed with helically extending teeth that are engaged with the teeth of the jaws. A coupling is interposed between the jaw support and the frame. Control means are provided for activating the coupling to temporarily lock the jaw support and allow relative rotation of the scroll wheel whereby the jaws undergo radial outward movement to thereby expand the band assembly and the tire disposed thereon. The scroll wheel and jaw arrangement affords true running over an extended service life because of the positive interconnection between the wheel and the jaws.

The tire supporting apparatus of the present invention also utilizes a resilient shroud which encloses the radially moveable elements of the assembly. The interior of the shroud is pressurized with superatmospheric air so as to preclude the entry of rubber dust into the mechanism of the wheel assembly. In this manner, fouling of the moving parts is prevented.

The tire supporting apparatus of the present invention includes a tire-receiving band assembly which may be readily changed to accommodate tires of varying sizes.

DESCRIPTION OF THE DRAWINGS

FIG. 2 is a fragmentary view similar to FIG. 1 showing the parts of the tire mounting apparatus in an expanded position;

FIG. 3 is a fragmentary front elevational view of said tire mounting apparatus;

FIG. 4 is a vertical sectional view taken on line 4-4 of FIG. 2;

FIG. 5 is a fragmentary central vertical sectional view taken in enlarged scale on line 5-5 of FIG. 4;

FIG. 6 is a vertical sectional view taken on line 6-6 of FIG. 5;

FIG. 7 is a vertical sectional view taken in enlarged scale along line 7-7 of FIG. 2;

FIG. 8 is a fragmentary view taken from the point designated 8 in FIG. 7;

FIG. 9 is a vertical sectional view taken in enlarged scale on line 9-9 of FIG. 7;

FIG. 10 is a vertical sectional view taken in further enlarged scale along line 10-10 of FIG. 9;

FIG. 11 is a fragmentary vertical sectional view showing how the band assembly may be replaced;

FIGS. 12, 13 and 14 are diagrammetrical views showing the operation of the scroll wheel and jaws of said apparatus; and FIG. 15 is a broken front view showing a jaw stop utilized in said apparatus.

DESCRIPTION OF THE PREFERRED EMBODIMENT

Figure 1:
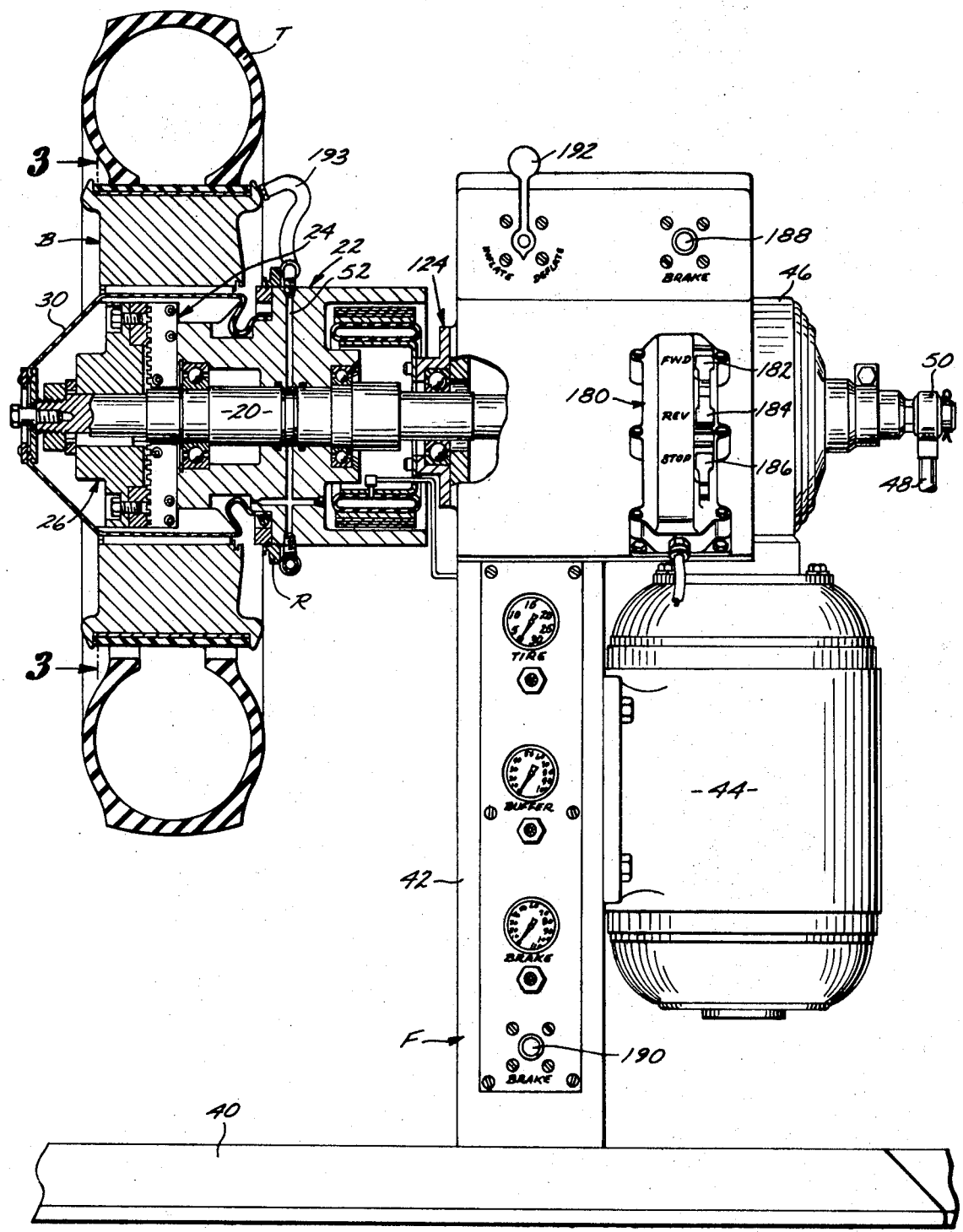
FIG. 1 is a side elevational view, which has been partially broken away in central vertical section, of a preferred form of tire mounting apparatus embodying the present invention.

Referring to the drawings, a preferred form of tire supporting apparatus embodying the present invention includes generally a frame F, a horizontally extending shaft 20 rotatably supported on the frame, a jaw support generally designated 22 which is rotatably supported by the shaft 20, a plurality of like jaws generally designated 24 carried by the jaw support 22 for radial movement relative thereto, a radially expandable band assembly B supported by the jaws 24 with such wheel assembly receiving a tire T when the band assembly is disposed in a contracted position, a scroll wheel generally designated 26 keyed to the shaft 20, a yieldable coupling such as a brake generally designated 28, interposed between the shaft 20 and jaw support 22, and control means to be described hereinafter which actuate the brake 28 to temporarily lock the jaw support while allowing rotation of the scroll wheel. The jaws 24 and the scroll wheel 26 are formed with complimentary helically extending teeth whereby the jaws will undergo radial outward movement and expand the bead assembly B and the tire T disposed thereon when the jaw support is temporarily locked and there is relative rotation of the scroll wheel, the parts of the apparatus moving from their position shown in FIG. 1 to their position shown in FIG. 2 as the wheel assembly A undergoes such radial expansion. A resilient shroud 30 encloses the scroll wheel 26 and jaws 24.

More particularly, the frame F includes a horizontal base 40 upon which is secured an upright housing 42. The upper portion of the housing 42 supports the shaft 20 by suitable bearing means. The shaft 20 is rotated by an electric motor 44 through a gear box 46 in a conventional manner. The shaft 20 is provided with an axially extending air passage 48 (FIG. 5), the rear end of which is connected to a source of pressurized air by means of a hose 48 through a conventional fitting 50. Such fitting permits relative rotation between the shaft and the hose 48.

Referring now additionally to FIG. 5, the jaw guide 22 is of generally annular configuration and includes a collar portion 50 which is bored to snugly receive the shaft 20. A plurality of radially extending air passages 52 are formed in the jaw support through collar portion 50 to connect with radial extensions 54 of the axial shaft passage 48. Seal rings 56 are carried by the collar portion 50 on either side of the passages 52. A forward extension 58 of at least one of the axial passages 52 is provided. Front and rear bearings 60 and 62 are interposed between the jaw support 22 and the shaft 20. The rear portion of the jaw support is formed with a rearwardly extending drum element 64 that encircles the brake 28. The jaws 24 are radially slidably supported within complimentary radially extending slots 68 formed in the forward portion of the jaw support 22. The jaws 24 are of like construction and are formed at their front portion with a plurality of generally helically extending teeth 72. The radially outer portion of each jaw 24 is rigidly secured to an end piece 74. The end pieces 74 are of like construction. Jaw stops 76 are provided on the jaw support 22 to limit radial outward movement of the jaws 24, as shown particularly in FIG. 15.

The shroud 30 is formed of a suitable resilient material such as a synthetic rubber. The rear end of the shroud is affixed to the intermediate portion of the jaw support 22 by a clamp 80. The intermediate portion of the shroud is retained upon the outwardly-facing surfaces of the jaw end pieces 74 by means of a plurality of cap strips 82, one cap strip being provided for each of the end pieces. The cap strips 82 are secured to the end pieces 74 by cap screws 84. The front end of the shroud 30 is sandwiched between an end plate 86 and a retainer plate 88. The end plate 86 and retainer plate 88 are coaxially rotatably supported upon the front end of the shaft 20 by means of a shoulder bolt 90, the shoulder portion 92 thereof abutting the front end of the shaft 20. It should be noted that the shoulder portion 92 of bolt 90 is of sufficient length to permit axial slidial movement of the plates 86 and 88 therealong. It should be further noted that the plate 86 is formed with apertures 96 and that the central bore 97 of end plate 88 is greater than the diameter of bolt shoulder 92.

The scroll wheel 26 includes a main body 100 and a scroll 102 secured within an annular groove 102 formed in the rear peripheral portion of the body 100 by a plurality of screws 104. The rear portion of the scroll 102 is formed with helically extending threads 106 that are complimentally engaged with the threads 72 formed in the jaws 24. A key 107 is interposed in complimentary axial slots formed in the main body 100 and the front portion of the shaft 20. A nut 108 and a washer 110 interposed therebetween secure the body 100 of the scroll wheel in place upon the front end of shaft 20.

The brake is of convention construction and includes a resilient bladder 120 that encircles a dish-shaped retainer 122 affixed to a bearing retainer 124 disposed on the front of the frame housing 42. The interior of the bladder 120 is connected with a source of superatmospheric air by means of a fitting 126 and tubing 128. The radially outer surface of the bladder 120 supports brake lining material 130. In the operation of the brake 28, pressurized air is admitted to the interior of the bladder 120 so as to effect radially outward expansion thereof with such expansion moving the brake lining material 130 into yielding frictional engagement with the interior of the drum 64 of jaw support 22.

As shown particularly in FIGS. 2 and 3 through 8, the expanding band assembly B includes a plurality of segment members generally designated 150 of like construction, arcuate connector plates 151, and an airtight resilient band 152 which encircles the segments and connector plates and retains them together as a single unit. As indicated particularly in FIGS. 3 and 4, each segment 150 is generally T-shaped when viewed from the front of the apparatus and includes a radially extending leg 154 which is integral at its radially outer end with a head 155. The radially outer surface of each head 155 is of annular configuration, with such radially outer surfaces collectively defining a circle. The connector plates 151 are of like construction and include an arcuate element 156 that bridges two adjoining segment heads 155 and a radially inwardly extending pin 157 disposed in a slot 158 of one of the segment heads as shown in FIGS. 7 and 8. The radially inner ends of the legs 154 are formed with axially extending grooves 160 which are slidably received by the radially outer ends of the cap strips 82 of the jaws 24, a segment 150 being provided for each of the jaws 24. If desired, the radially inner surfaces of the legs 154 may be inclined at an angle to facilitate sliding the legs 150 rearwardly onto and forwardly off the cap strips 82 in a manner to be described hereinafter. It should be particularly noted that the band assembly B is a unitary self-supporting unit which facilitates manual handling thereof.

Referring to FIGS. 9 and 10, it should be noted that preferably the band 152 is formed of a resilient material such as synthetic rubber into which is molded transversely-extending cross strands of cordage 163 providing minimum transverse stretching while permitting free circumferential stretching of the band. This arrangement precludes lateral stretch and consequent folding or buckling of the band by the tire beads during expansion of the band assembly B.

Referring again to FIG. 1, the control system for the apparatus of the present invention includes a motor control box generally designated 180 secured to the upper rear portion of the frame housing 42. The switch box 180 includes a "forward" switch 182, a "reverse" switch 184, and a "stop" switch 186. To effect forward rotation of the shaft 20, switch 182 is depressed. If switch 186 is depressed the shaft 20 will stop and thereafter switch 184 may be depressed so as to effect reverse rotation of the shaft 20.

The upper rear portion of the frame housing 42 carries a low-pressure push button 188 for operating the brake 28. When this push button is depressed, air under comparatively low superatmospheric pressure will be directed into the confines of the bladder 120 so as to expand the brake liner material 130 into yielding engagement with the interior of the jaw support drum 64. A high-pressure brake push button 190 is mounted at the lower portion of the frame housing 42. When this button is depressed, air under higher pressure than that admitted by depressing push button 188 is directed into the interior of the bladder 120. A tire inflate-deflate lever 192 is mounted on the upper front portion of the frame housing 42. This handle 192 is suitably connected to conventional valving so as to direct superatmospheric air through the passages 48 and 54 of shaft 20 and passages 52 of jaw support 22. This pressurized air will then be conducted to one or more of the segments 150 by means of flexible tubing 193. As indicated in FIGS. 7 and 9, a segment 150a is formed with an air passage 194. The outer end of passage 194 receives a fitting 195 connected with flexible tubing 193. The opposite end of this passage 194 terminates in a second fitting 196 that extends radially outwardly through band 152 so as to conduct air into the interior of tire T. A pressure-relief valve (not shown) may also be provided in one or more of the segments to discharge air from between band 152 and the interior of tire T.

In the operation of the aforedescribed apparatus, with the parts of the apparatus disposed in their position of FIG. 1, a tire T is slipped onto the band assembly B. Such band assembly being in a contracted position. Thereafter the operator moves the air control lever 192 into its tire inflating position. Pressurized air is then directed into the confines of the tire T. The operator then depresses the "forward" motor control switch 182 so as to effect forward rotation of the shaft 20. Since the brake 28 is actuated, the jaw support 22 will be yieldingly restrained against rotation with the shaft 20 and, accordingly, the jaws 24 and their associated parts will undergo radially outward movement relative to the scroll wheel 26. This movement is shown in FIGS. 12, 13 and 14 wherein it will be noted that because of the interengagement of the jaw threads 72 with the scroll wheel threads 106, the jaws 24 will be urged radially outwardly relative to the scroll wheel 26.

Radial outward movement of the jaws 24 and their associated parts will continue until these parts assume their position indicated in FIG. 2. At this time, the beads of the tire T will be maintained in sealing engagement with the band 152. At this point, brake control switch 188 is released and the frictional resistance between the threads 72 and 106 of the jaws 24 and the scroll wheel 26 will preclude reverse radially inward movement of the jaws relative to the scroll wheel. The tire T is now undergoing forward rotation and the desired tire treating operation, such as buffing may take place. At the conclusion of such operation, the air control lever 192 is moved to its "deflate" position. This serves to vent the interior of the tire T with the atmosphere by means of suitable conventional valving. Forward rotation of the shaft 20 is then stopped. The operator then pushes the "reverse" switch 184 so as to effect reverse rotation of the shaft 20, and at approximately the same time the operator again pushes the low-pressure brake push button 188. This should cause the jaws 24 to undergo radially inward movement relative to the scroll wheel 26. Occasionally, however, it is necessary to apply higher brake pressure to overcome the frictional resistance between the jaws 24 and the scroll wheel 26 and in such event, the operator depresses the high-pressure push button 190.

It should be particularly noted that during the tire buffing operation or other such operation wherein rubber dust is produced, such dust is prevented from fouling the jaws 24 and scroll wheel 26 by means of the shroud 30, pressurized air entering this space through shaft passages 48 and 54 and jaw support passages 52 and 58. As shown clearly in FIG. 5, it should be noted that even should the shroud 30 be punctured or should another type of air leak occur, the constant introduction of pressurized air within the space encompassed by the shroud 30 will insure that no foreign matter can enter such space, When the bead assembly B is retracted, air will escape from within the shroud through apertures 96 formed in plate 88 and the space between the bore 97 of end plate 86 and the shoulder 92 of bolt 90.

Referring now to FIG. 13, it should be particularly noted that it is an advantage of the tire supporting apparatus of the present invention that the bead wheel assembly B may be readily changed to accommodate tires of varying sizes. Thus, assuming that a tire of smaller diameter than could be accommodated by the bead wheel assembly B shown in the drawings is to be buffed a second bead assembly (not shown) may be provided having segments 150 of shorter length than those shown in FIGS. 1 through 7 is employed. Referring to FIG. 11, to remove the first bead wheel assembly B, a stop ring R is utilized. This stop ring R is arranged in its inoperative position of FIGS. 1 and 2 during normal operation of the apparatus. As indicated in FIG. 11, stop ring R includes a lip 200 which is received within a complimentary annular groove 202 formed in the rear radially inner portion of each of the segments 150. The diameter of the stop ring is adequate to maintain the radially inner surface of the bead assembly B outwardly from the cap strips 82 when the jaws are disposed in their radially inner contracted position. To remove the bead assembly B from the jaw cap strips 82, the lip 200 of the stop ring R is inserted within the grooves 202 as the bead assembly B is being retracted. When the jaws 24 have been completely retracted, the stop ring R will support the bead assembly B in a circular configuration free of the jaw cap strips 82. As indicated in FIG. 11, the bead assembly B may then be readily moved axially forwardly off of the cap strips 82. A second bead assembly B of a different outside diameter may then be slid over the jaw cap strips 82. As the second bead assembly B undergoes expansion the stop ring R may be removed therefrom for subsequent use during the next bead wheel assembly change. The stop ring R therefor considerably facilitates the replacement of bead wheel assemblies since it eliminates the radially inwardly directed bind which is created by the resilient seal ring 152, such ring having a smaller relaxed diameter than the diameter of the circle defined by the jaw cap strips 82 when the jaws are completely retracted.

While there has been shown and described hereinbefore what is presently considered to be a preferred embodiment of the present invention, it will be apparent that various modifications and changes may be made thereto without departing from the spirit of the present invention.

We claim:

1. Tire supporting apparatus, comprising:
   a frame;
   a shaft rotatably supported on said frame;
   a jaw support rotatably supported by said shaft;
   a plurality of jaws carried by said jaw support for radial movement relative thereto, said jaws being formed with helically extending teeth;
   a radially expandable band assembly supported by said jaws, said band assembly receiving a tire when said band assembly is disposed in a contracted position;
   a scroll wheel keyed to said shaft and formed with helically extending teeth engaged with the teeth of said jaws;
   coupling means interposed between said jaw support and said frame;
   and control means for actuating said coupling means to thereby temporarily restrain said jaw support against rotation relative to said frame whereby said jaws undergo radial outward movement and expand said wheel assembly and the tire disposed thereon.

2. Tire supporting apparatus as set forth in claim 1 wherein said coupling means is a yieldably applicable brake.

3. Tire supporting apparatus as set forth in claim 1 which further includes a pneumatic system for inflating said tire.

4. Tire supporting apparatus as set forth in claim 3 wherein a resilient shroud encloses said jaws and said scroll wheel and said pneumatic system supplies air under superatmospheric pressure to the interior of said shroud when said wheel assembly is expanded.

5. Tire supporting apparatus as set forth in claim 1 wherein said band assembly includes a plurality of segments having radially inner portions received by said jaws and radially outer portions which are encircled by an airtight resilient band that retains said segments together as a single unit, with the relaxed diameter of said bands being less than the expanded diameter of said wheel assembly.

6. Tire supporting apparatus as set forth in claim 5 wherein the radially inner portions of said segments are removably supported by said jaws, and said apparatus also includes a stop ring selectively engageable with said segments to retain said segments together defining a circle having an inner diameter greater than the outer diameter of the circle defined by said jaws when said jaws are arranged to support said band assembly in said contracted position.

7. Tire supporting apparatus, comprising:
   a frame;
   a shaft rotatably supported on said frame;
   a radially expandable band assembly carried by said shaft for radial movement relative thereto, said band assembly receiving the beads of a tire;
   power-operated radially movable elements interposed between said shaft and said band assembly to effect radial expansion and contraction of said band assembly and a tire disposed thereon;
   a resilient shroud enclosing said radially movable elements to restrain foreign matter from contact therewith;
   first air passage means extending through said band assembly to the interior of said tire;
   second air passage means extending through said shroud; and
   a pneumatic system for introducing air under superatmospheric pressure through said first and second air passage means.